United States Patent [19]
Moss et al.

[11] Patent Number: 5,604,870
[45] Date of Patent: Feb. 18, 1997

[54] UART EMULATOR CARD

[76] Inventors: Barry Moss, 2560 Adelaide Street, Matsqui, British Columbia, Canada, V2T 3L7; Denis Beaudoin, 12353 Northpark Cres., Surrey, British Columbia, Canada, V3X 2A9

[21] Appl. No.: 283,365

[22] Filed: Aug. 1, 1994

[51] Int. Cl.$^6$ .................................................. G06F 13/00
[52] U.S. Cl. ................ 395/280; 395/200.2; 395/500; 395/872; 395/878; 395/882; 395/884
[58] Field of Search ................................ 395/325, 500, 395/280, 200.2, 872, 878, 882, 884

[56] References Cited

U.S. PATENT DOCUMENTS

| | | | |
|---|---|---|---|
| 4,823,312 | 4/1989 | Michael et al. | |
| 5,117,500 | 5/1992 | Davis et al. | 395/800 |
| 5,140,679 | 8/1992 | Michael. | |
| 5,170,470 | 12/1992 | Pindar et al. | 395/275 |
| 5,199,105 | 3/1993 | Michael. | |
| 5,375,051 | 12/1994 | Decker et al. | 363/49 |
| 5,412,795 | 5/1995 | Larson | 395/500 |

*Primary Examiner*—Jack B. Harvey
*Assistant Examiner*—John Travis
*Attorney, Agent, or Firm*—Charles W. Bethards; Kevin A. Buford

[57] ABSTRACT

An interface device (102) and corresponding method for coupling a peripheral controller (117) to a host computer (100), the interface device including an emulated universal asynchronous receiver transmitter (UART) (113) for the host computer. The interface device further includes a plurality of registers (203), preferably a control (215), status (227), and data register, such as a multi-register data buffer (401), corresponding to the registers of a UART, a host computer port (112), preferably compatible with a PCMCIA standard, that includes an address map for the plurality of registers (203), a peripheral controller port (114) providing an address mapped parallel interface to the plurality of registers (203), and control logic (207) for providing status signals, including UART status signals, to the host computer port and to the peripheral controller port. The interface device may further include a pacing circuit (303) for substantially emulating, preferably dependent on a baud rate of the data information, the timing limitations of the UART.

15 Claims, 9 Drawing Sheets

UART EMULATOR CARD

FIELD OF THE INVENTION

Generally the instant disclosure deals with an interface for a peripheral card and more specifically but not limited to such an interface between a host computer and a peripheral controller.

BACKGROUND OF THE INVENTION

General and special purpose host computers often include provisions for various peripheral functionality, such as a communications modem, memory expansion, or an add on hard disk drive. In order to facilitate the addition of various peripherals the Personal Computer Memory Card International Association (PCMCIA) has endeavored to standardize a family of peripheral interfaces. The PCMCIA defined parameters can be found in the PC Card Standard Release 2.0 document, published by the Personal Computer Memory Card International Association, 1030B East Duane Avenue, Sunnyvale Calif. The defined parameters include physical parameters such as dimensions, input/output connections such as control, address, and data buses, signal parameters such as operating levels and impedances, etc.

To facilitate a logical interface between a host computer bus and a PCMCIA interface port various manufacturers such as Intel have developed PCMCIA slot interface integrated circuits (IC). These ICs facilitate a largely transparent parallel interface from the host computer bus to peripheral functions such as the host port of a universal asynchronous receiver transmitter (UART) like National Semiconductor's NS 16550A or NS 16450. Additionally computer operating system software such as various well known Disk Operating Systems like Microsoft disk operating system (MS-DOS) have been developed and proven to provide a reliable and straight forward logical interface between a host computer and a UART. Additionally, a large pool of applications software including proven communications software that expects to see a UART like host port is available.

For many peripheral functions such as a wireline modem or other relatively passive functions the present interfaces are satisfactory. The manufacturer of the peripheral includes a UART device as the initial portion of the interface to the host computer and receives or provides serial data, respectively, from or to the UART to complete the interface between the host computer and a peripheral function. However, the UART device does require physical space that may not be available, represents an economic burden, and may otherwise be a suboptimum interface for some applications that include resident intelligence in the form of a controller. Some manufacturers have developed proprietary interfaces for the host computer to peripheral interface, particularly when a peripheral controller is present. This may be acceptable in the case of a special purpose host when the manufacturer has control of the host computer hardware and operating system software as well as the peripheral function. However this is not typically the case and does requires extra effort to develop the proprietary interface and assure ongoing compatibility with the operating software of the host.

Clearly a need exists for an interface between a host computer and a peripheral controller that takes advantage of existing host operating systems.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Generally the instant invention deals with interfaces between a host computer and a peripheral card, and corresponding methods of providing such interfaces. More particularly it concerns such peripheral cards that have a controller or embedded controller or processor that requires or prefers a parallel interface. A preferred embodiment in accordance with the instant invention is fully compliant with PCMCIA standards and provides the look and feel of a standard UART from the host computer's perspective. The look of a standard UART is generally construed herein to mean that all address and data buses and status and control signals are functionally or logically identical to a UART. The feel of a standard UART is generally construed herein to mean that various limitations associated with a UART, such as timing constraints or interrupt rates, etc. are substantially similar to the standard UART. Much of this disclosure presumes a reasonable background in and knowledge of the functions and characteristics of a UART. Such information is well known and may be obtained from any relatively current version of a semiconductor integrated circuit data sheet published by National Semiconductor and titled "NS16550AF Universal Asynchronous Receiver/Transmitter with FIFOs".

A preferred embodiment in accordance with the instant invention is an interface device (102) for coupling a peripheral controller to a host computer. The interface device includes an emulated, from the perspective of or for the host computer, universal asynchronous receiver transmitter (UART) and more specifically includes a plurality of registers corresponding to the registers of a UART, a host computer port that includes an address map for the plurality of registers, a peripheral controller port providing an address mapped parallel interface to the plurality of registers, and control logic for providing UART status signals to the host computer port and to the peripheral controller port. The preferred embodiment was developed and designed in accordance with well known techniques and tools using a Verilog Hardware Description language to create a register-transfer level (RTL) description file. This description file was used as the input to a logic compiler program that in turn produced a gate-level logic description in accordance with the RTL description file. This gate-level logic description, together with other ancillary logic functions, was implemented as an application specific integrated circuit using a 0.8 micron CMOS gate array process available from manufacturers such as Atmel Corp.

Figure 1:
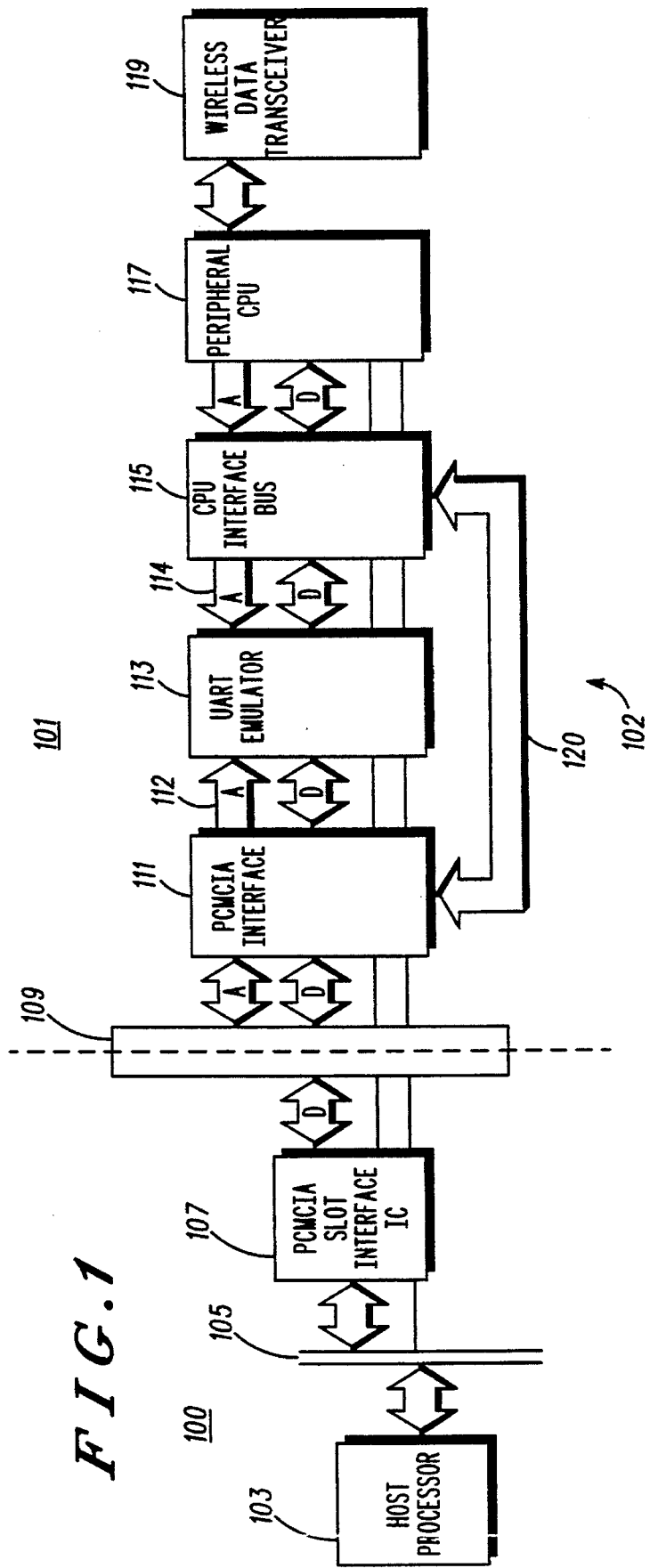
FIG. 1 is a block diagram illustrating an application of an interface embodiment in accordance with the instant invention.

The present invention can be more fully described and appreciated with reference to the figures in which FIG. 1 is a block diagram illustrating an application of an interface embodiment in accordance with the instant invention. Referring to FIG. 1, a host computer (100) is shown coupled or interfaced to a peripheral function (101) at a PCMCIA port (109) that includes a mated PCMCIA 68 pin connector pair. The host computer (100), depicted in relevant part, includes a host processor (103), such as an Intel X86 series microprocessor, coupled to the PCMCIA port (109) by way of a host bus (105), such as the well known AT bus, and a PCMCIA slot interface circuit (107), such as an Intel 82365SL PC Card Interface Controller (PCIC). The host computer (100) is expected to be running an established and well known operating system, such as the Microsoft disk operating system (MS-DOS), or other applications software program that includes proven input/output communications drivers, such as COM1, COM2, COM3, or COM4 that are expecting to see a UART-like logical interface. The preferred embodiment advantageously provides a logical interface at the PCMCIA port (109) that from the perspective of the host computer has the look and feel of a UART. Thus any software running on the host computer (100) and having software routines, specifically communications drivers, arranged to interface to a UART should operate satisfactorily without additional modifications.

The peripheral function (101), preferably a wireless modem, may be any such function with sufficient sophistication to have an embedded controller or peripheral controller, such as CPU (117). CPU (117), preferably a Motorola 68300 series microprocessor, is expected to have sufficient flexibility or functionality to manage or service at least in part a host computer port that emulates a UART. The peripheral function (101) includes, parallel coupled to the PCMCIA port (109), a PCMCIA interface (111) that is further parallel coupled at a host computer port (112) to a UART emulator (113). The UART emulator (113) is coupled, preferably in a parallel fashion, at a peripheral controller port (114) to a CPU interface bus (115) and thereafter to the CPU (117). The PCMCIA Interface (111) is also coupled directly to the CPU Interface (115) through the Interface Control Bus (120). Together the PCMCIA interface (111), UART emulator (113), and CPU interface bus (115) and the Interface Control Bus (120) may be viewed as the interface device (102). The CPU (117) is coupled to and controls or assists, in the preferred case, a wireless data transceiver (119). The host computer port (112) includes an address map for a plurality of registers that correspond to the registers, including a control, status, and data register, of a standard UART. Thus the host computer port has the look of a UART, including a multi-register data buffer for transmit or receive data. Additionally the UART emulator (113) may include a pacing function or circuit that paces or times the rate of access, by the CPU or host processor, to the multi-register data buffers so as to substantially emulate the timing limitations of a typical UART serially communicating data at a given baud or bit rate thereby giving the host computer port (112) the feel of a UART like logical interface. Such a pacing function or circuit may be advantageous because the peripheral controller port (114) provides, preferably and in contrast to the serial interface of a standard UART, an address mapped parallel interface to the plurality of registers for the CPU (117). Since the data transfer rate over a parallel interface may exceed the transfer rate over a serial link the pacing circuits and functions serve to eliminate the possibility that the host processor is unduly occupied servicing the emulated UART.

The PCMCIA Interface (111) includes, logically, a plurality of registers as per the known requirements defined in the PCMCIA PC Card Standard Release 2.0 document. The PCMCIA Interface also includes various control logic (not specifically shown) that decodes the PCMCIA address and control lines to determine when a bus read or write operation pertains to the UART Emulator (113), rather than other PCMCIA functionality. If so, this logic also generates control signals including read/write controls for the host port (112) of the UART Emulator (113). The PCMCIA Interface also transmits and receives status information unrelated to the UART emulator (113) to and from the CPU Interface (114) over the Interface Control Bus (120).

The CPU Interface (115) includes, logically, a plurality of registers and various control logic (not specifically shown) that decodes the CPU address and control lines to determine when a bus read or write operation pertains to the UART Emulator (113). If so, this logic generates control signals including read/write controls for the CPU port (114) of the UART Emulator. The CPU Interface (115) also transmits and receives status information unrelated to the UART emulator (113) to and from the PCMCIA Interface (111) over the Interface Control Bus (120).

The CPU (117) acts as the central controller for the peripheral device (101). The CPU collects inbound data from the UART Emulator (113), processes that data and then passes the processed data to the wireless data transceiver (119). The CPU also receives outbound data from the wireless data transceiver, processes the data, and passes the processed data to the UART Emulator (113). In addition, the CPU also controls the operation of the wireless data transceiver, performing some of the higher level functions, such as grouping outbound data into packets, un-packetizing inbound data, and power management, as required by the transmission protocol that is used by the wireless data transceiver. The CPU may operate using internal Random Access Memory and Read Only Memory or may have external Random Access Memory and Read Only Memory.

Figure 2:
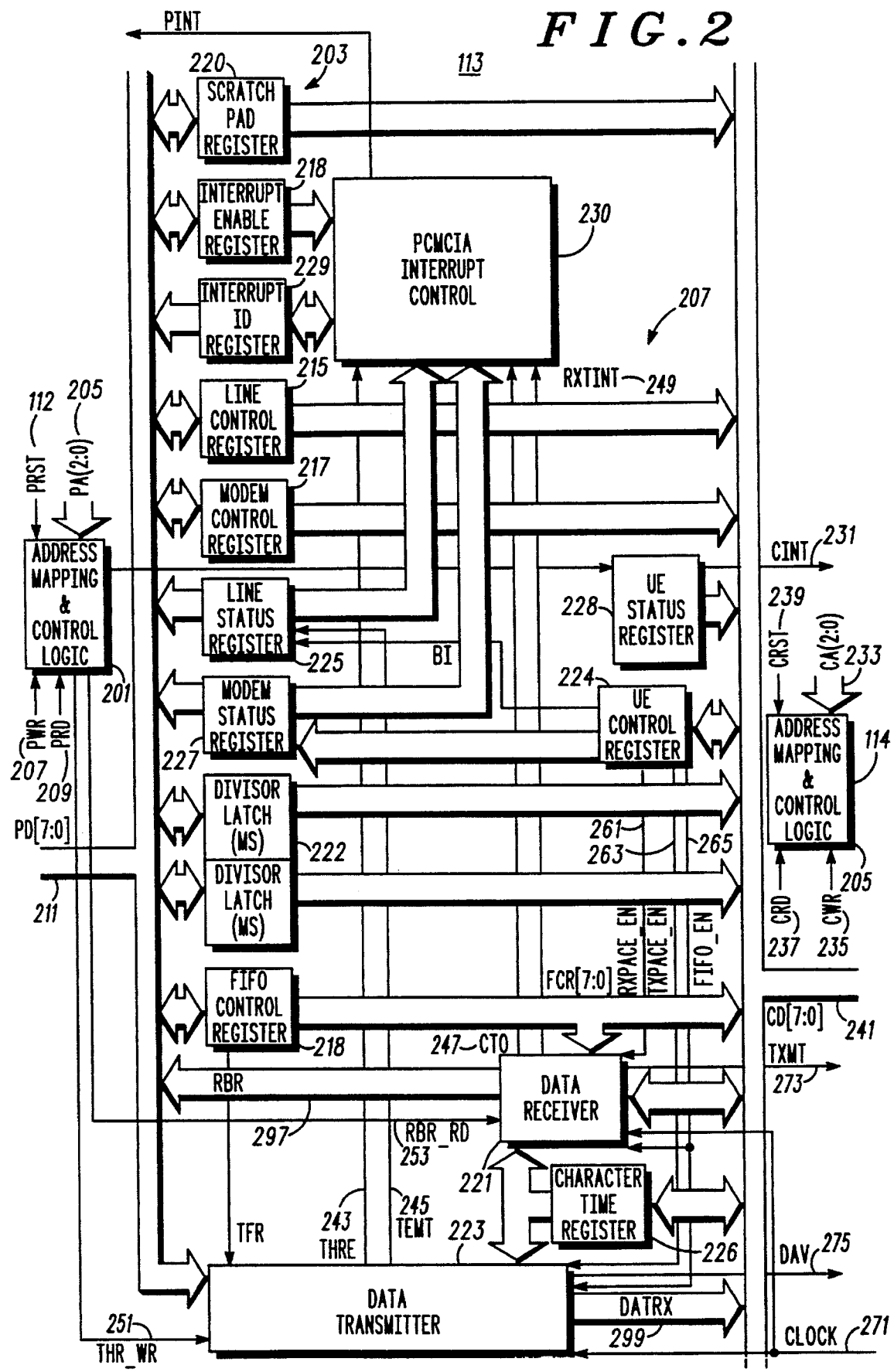
FIG. 2 is a block diagram depicting the functional data flows associated with a portion of the FIG. 1 embodiment.

Referring to FIG. 2 where like elements from FIG. 1 have like reference numerals, a more detailed description of the UART emulator (113) will be undertaken. Generally FIG. 2 depicts in block diagram form and in part the FIG. 1 embodiment of the instant interface, specifically, the UART emulator (113) and relevant functional data flows found within this emulator. More particularly FIG. 2 depicts the host computer port (112) including an address map or address mapping and control logic circuit (host logic) (201) for a plurality of registers (203), the peripheral controller port (114) that provides an address mapped parallel interface, via a CPU address mapping and control logic function (CPU logic) (205), to the plurality of registers (203), and control logic (207) that provides status and control signals to the host computer port (112) and to the peripheral controller port (114). FIG. 2 does not depict all of the internal control and status interconnections as these are well known in the art.

The host computer port (112) logically includes, coupled to the host logic, a three bit wide address bus (PA[2:0]) (205), that specifies which of the plurality of registers or UART Emulator registers is to be accessed, a write strobe (PWR) (207), that indicates that the register specified by the address bus (205) should be written, and a read strobe (PRD) (209) that indicates that the register specified by the address bus is being read. Further the host computer port (112) includes a data bus (PD[7:0]) (211) that is an 8 bit wide data path to or from the selected register and a PINT (213) that provides an interrupt signal to the PCMCIA Slot Interface IC (107). In operation, the Host logic (201), generates, as appropriate, write strobes for each of the plurality of registers (203) and read strobes for certain of the plurality of registers. The Host Logic decodes the address using a 3-to-8 binary decoder to create a register select signal (not specifically shown) associated with each address or register. In addition, a DLAB bit, used to enable the divisor latches (222) and stored within a Line Control Register (215), is used in the decoding process to create two additional register select signals, each one associated with one of eight addresses, and also associated with a given state of the DLAB bit. The mapping of address data and the DLAB bits to specify registers in the UART Emulator is identical to the mapping used in the National Semiconductor NS16550A UART and thus is well known and readily available. In any event, the register select signals are then logically ANDed with the write strobe to create individual write strobes for each of the registers (203) that may be written from the host interface. (Some registers, for example an interrupt ID register (229), a line status register (225) and a modem status register (227), are read-only and can not have their contents modified by the host interface). Similarly, some of the register select signals are then logically ANDed with the read strobe to create individual read strobes for some of the plurality of registers (203).

The plurality of registers (203), corresponding to the registers of a UART, include various control, status, and data registers. Control registers are exemplified by the line control register (LCR) (215), a modem control register (MCR) (217), a FIFO control register (FCR) (218), an interrupt enable register (IER) (219), a scratch pad register (SCR) (220) and a two-part divisor latch register (DLL and DLM) (222), referred to as the divisor latches above. Status registers include the line status register (LSR) (225), the modem status register (MSR) (227), and the interrupt identification register (IIR) (229). Data registers including a multi-register data buffer are included in a data receiver (221) and a data transmitter (223) that will be discussed further below.

The control and status registers appear to operate the same as a National Semiconductor NS16550A UART from the point of view of the host computer port (112), although the actual circuitry that acts on the control bits and produce the status bits is quite different. The LCR (215), MCR (217), SCR (220), DLL and DLM (222) registers are readable through the peripheral controller port (114). The CPU (117) is notified by an interrupt mechanism, specifically a CPU interrupt signal (CINT) (231), whenever the host writes one of these registers. The CPU is able to respond by writing data to a UART control register (224), the data receiver (221), or a character time register (226).

The peripheral controller port or CPU port (114) logically includes, coupled to the CPU logic (205), a three bit wide address bus (CA[2:0]) (233), that specifies which of the UART Emulator registers is to be accessed, a write strobe (CWR) (235), that indicates that the register specified by the address bus should be written, a read strobe (CRD) (237) that indicates that the register specified by the address bus is being read, and a CPU reset signal (CRST) (239) that clears all registers that can be written by the CPU as well as the data transmitter (223) and the data receiver (221). Additionally the CPU port (114) includes a data bus (CD[7:0]) (241) that is an 8 bit wide data path to and from the CPU (117), a transmit buffer empty flag (TXMT) (273) that indicates when the CPU can place data in the data receiver (221), and a data available flag (DAV) (275) that indicates that there is data waiting for the CPU in the data transmitter (223).

The CPU logic (205), creates write strobes for the UART Emulator Control Register (224), the data receiver (221), the Character Time Register (226), and read strobes for the data transmitter (223) and a UART Emulator Status Register (228). The CPU Logic decodes the address on CA[2:0] using a 3-to-8 binary decoder to create a register select signal associated with each address. The register select signals are then logically ANDed with the write strobe to create individual write strobes for each of the registers that may be written from the CPU port (114). (Some registers are read-only and can not have their contents modified from the CPU port). Similarly, some of the register select signals are then logically ANDed with the read strobe to create individual register read strobes.

Figure 3:
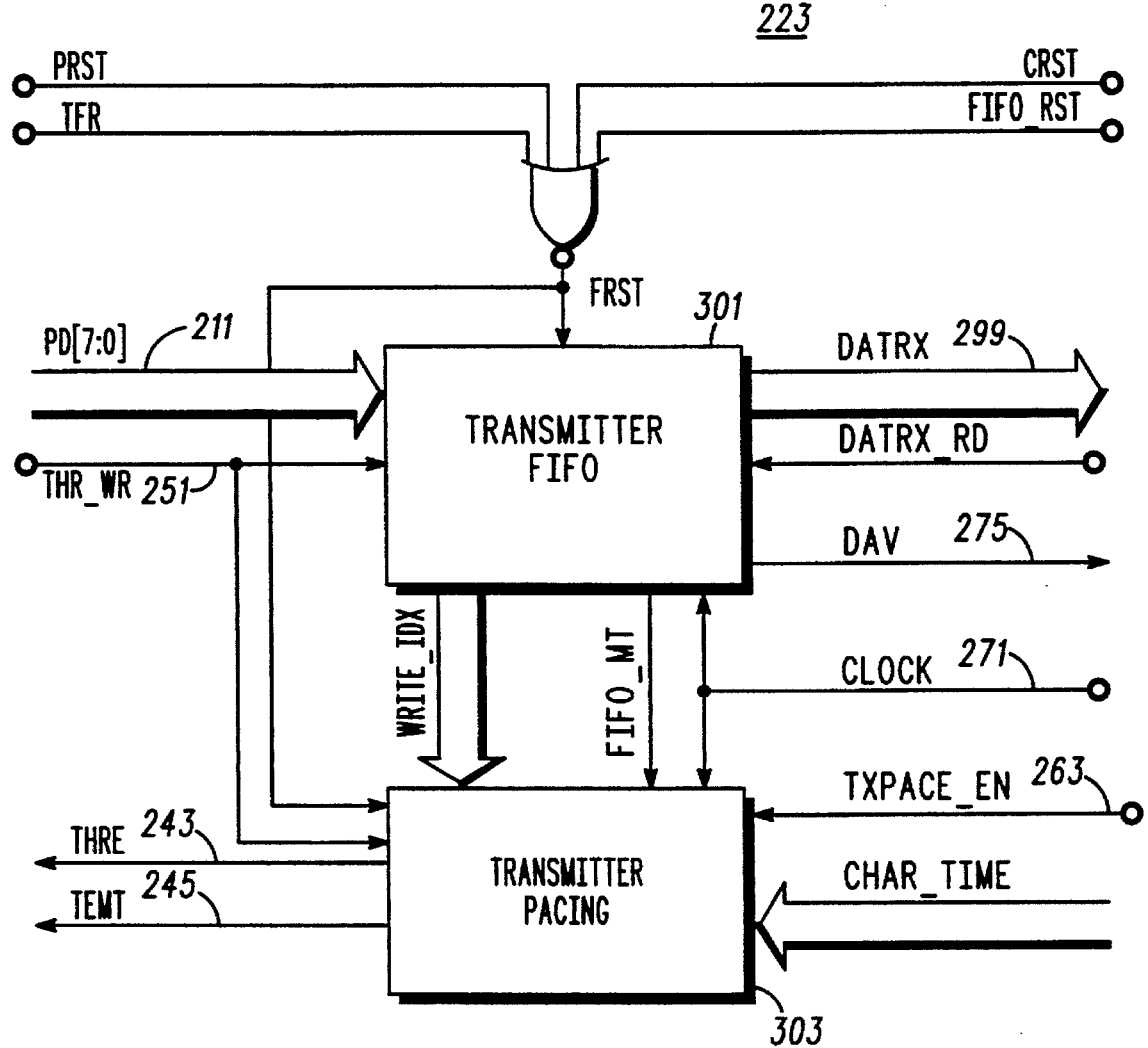
FIG. 3 is a block diagram of a data transmitter as shown generally in FIG. 2.
Figure 6:
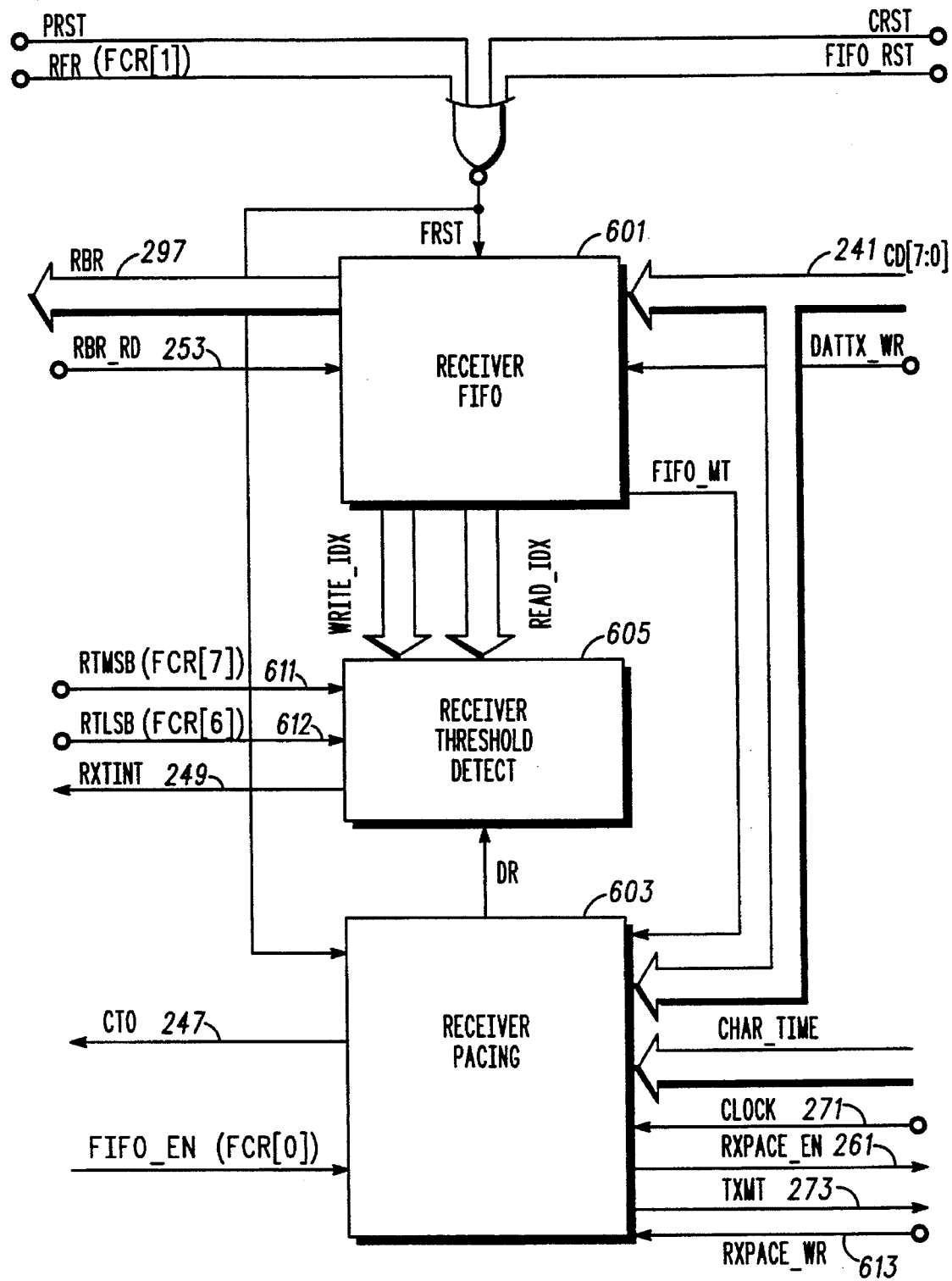
FIG. 6 is a block diagram of a data receiver as shown generally in FIG. 2.

Referring to FIG. 3 and FIG. 6, a description, respectively, of the data transmitter (223) and the data receiver (221) will be provided. The data transmitter (223) in FIG. 3 includes two major functional elements, specifically a TX FIFO (301) and a transmit pacing circuit (303). The TX FIFO (301) is a multi-register data buffer, preferably first-in first-out, particularly arranged for the temporary storage of data that has been sent or transmitted by the host processor (103) and intended for the CPU (117) or peripheral controller. The transmit pacing circuit (303) is arranged and constructed for substantially emulating the timing limitations, constraints or characteristics of a UART from the perspective of the host computer port (112) accessing the multi-register data buffer to transmit or transfer data to the emulated UART.

The transmit pacing circuit (303) derives its timing from the CLOCK input signal (271), which has an operating frequency of 32.768 kHz. Since the clock speed is slow compared to typical microprocessor based circuits that usually operate in excess of 1.00 MHz, the CMOS circuits comprising the TX pacing circuit will consume very little power. Further, the CPU (117), preferably, uses a 32.768 kHz oscillator together with a phase-locked-loop to create its internal 12 MHz clock, so the UART Emulator's clock is provided without requiring an additional oscillator. In contrast, the NS16550A UART requires its own oscillator which operates at greater than 1.8 MHz in typical applications. Operationally the transmit pacing circuit delays the THRE (243) and TEMT (245) status flags back to the line status register (225) by a period of time equivalent to the time a NS16550A UART would typically require to transmit the data over a serial connection to tan end user at a given baud rate. Thus the feel of a standard NS16550A is emulated.

Referencing FIG. 2, the host processor (103) will write a value to the DLL and DLM registers (222) to specify the serial data rate or baud rate at which the UART emulator (113) should operate. The host processor (103) also indicates various information such as the number of data, parity and stop bits for a serial transmission in the LCR register (215). The UART Emulator does not divide a high speed clock as does the 16550A to create an internal bit and character clock. Instead, the CPU typically reads the values that the host processor (103) stored in the registers above, performs a calculation based on these values, preferably multiply the data latch value by eleven (11), divide the result by four (4), and then subtract one (1), to determine the number of 32.768 kHz clock cycles per character time period and writes this value to the character time register—CHAR_TIME (225). The value in the CHAR_TIME register is used by both the transmit pacing circuit (303) and a receive pacing circuit (603).

Similarly FIG. 6 depicts the data receiver (221) that includes three major functional elements, specifically a RX FIFO (601), the receive pacing circuit (603), and a RX threshold circuit (605). The RX FIFO (301) is a multi-register data buffer particularly arranged for the temporary storage of data that has been sent or transmitted by the CPU (117) and is intended for the host processor (103). The receive pacing circuit (603) is arranged and constructed for substantially emulating the timing limitations, constraints or characteristics of a UART from the perspective of the host computer port (112) when data is being received by a host processor. The RX threshold circuit (605) generates a receiver threshold interrupt signal (RXTINT) (249) to the PCMCIA Interrupt Control Logic (230) when the number of data bytes in the RX FIFO (601) exceeds a threshold limit, such as one, four, eight, or fourteen bytes, that is set by the host processor (103) by programming the receiver threshold bits, specifically a RTMSB bit (611) and a RTLSB bit (612) in the FIFO control register (FCR) (218).

Figure 4:
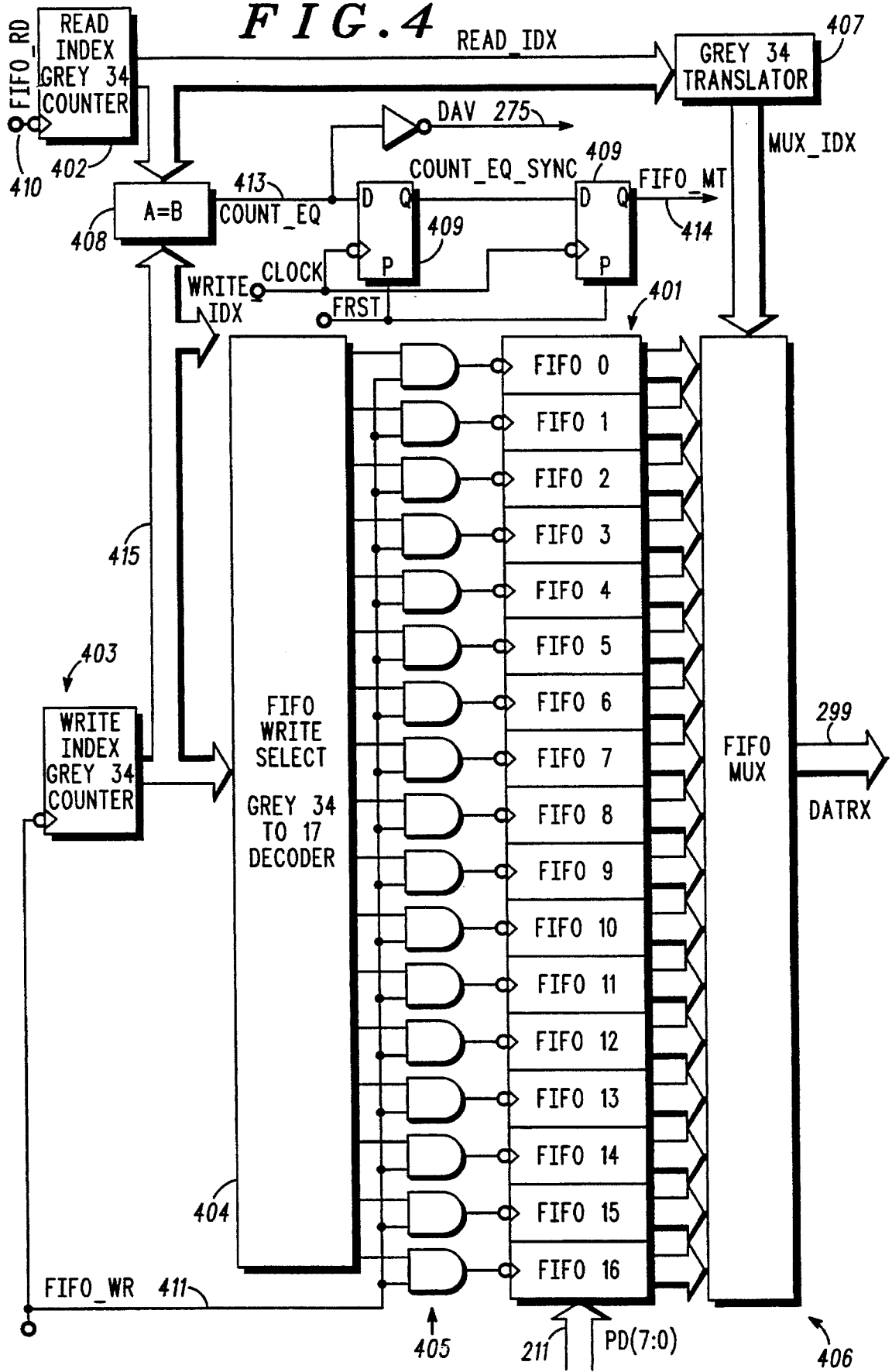
FIG. 4 is a more detailed block diagram of a transmitter buffer as shown generally in FIG. 3.

Referring to FIG. 4, the TX FIFO (301) will be described. The TX FIFO (301) includes a multi-register data buffer (401) having 17 8-bit registers, a read index counter (402), a write index counter (403), a write select decoder (404) a bank of 17 AND gates (405), a 17:1, 8 bit wide, data bus multiplexer (406), a grey code 34 translator (407), a data comparator (408), and a synchronization circuit (409). The buffer contains 17 bytes in order to emulate the operation of the NS16550A which contains a 16 byte TX FIFO as well as a transmitter shift register. Each of the buffer registers is a simple 8 bit register. The input controls to the TX FIFO consist of a read strobe, FIFO_RD, (410) and a write strobe, FIFO_WR, (411). Each time a byte of data is written to the TX FIFO, the write index counter is advanced at the end of the write cycle. Each time a byte of data is read from the TX FIFO, the read index counter is advanced at the end of the read cycle. The counters are both grey encoded so that no more than one output bit will change each time either of the counters is advanced. The counters each contain 34 states in 17 pairs so that when both index counters point to the register it is possible to determine if the FIFO is empty (all data read) or if the FIFO is full (all 17 bytes have been written and none have been read).

The write select decoder (404) decodes the output of the write index counter (403) and asserts a single write select line associated with one of the FIFO registers (401). The select line is gated by the bank of AND gates (405) with the FIFO_WR signal (411) to create a single write strobe to the register index by the write index counter.

The grey 34 translator (407) converts the grey 34 code to a 5 bit binary code, that selects which one of the FIFO registers outputs is placed on the output bus, DATRX (299), by the FIFO data multiplexer (406).

Figure 7:
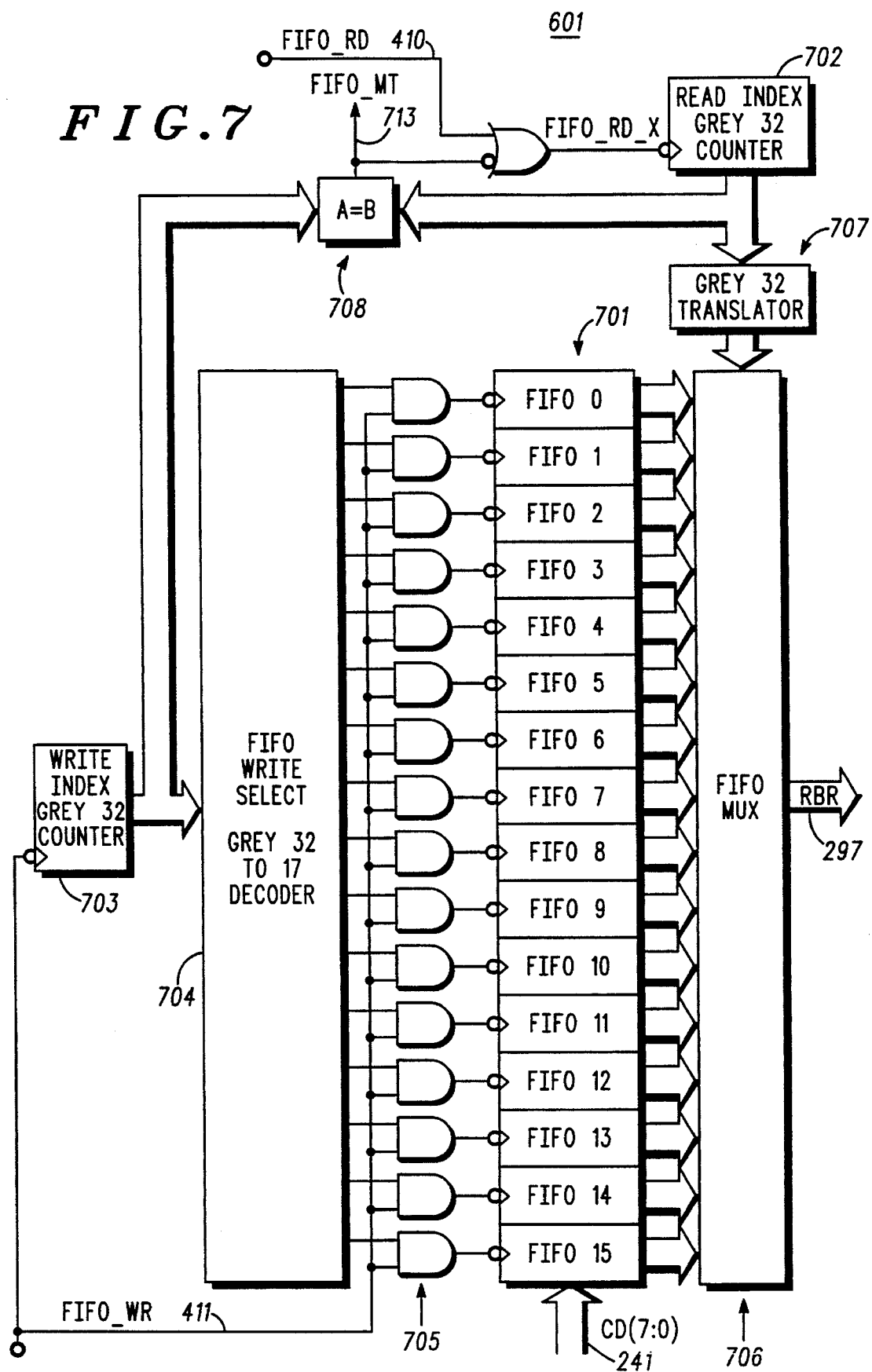
FIG. 7 is a more detailed block diagram of a receiver buffer as shown generally in FIG. 6.

The output of the read index counter (402) and the write index counter (403) are compared by the data comparator (408). If both counters have the same value, the COUNT_EQ signal (413) is asserted indicating that the TX FIFO is empty. Since the TX FIFO may be both read and written at the same time, COUNT_EQ is not stable, and is resynchronized by the two flip-flops of the synchronizer circuit (409) to produce a stable FIFO_MT (414) signal. Since the CPU can accommodate potential glitches on the data available signal, DAV (275) is derived by inverting the COUNT_EQ signal Similarly FIG. 7 depicts the RX FIFO (601) that includes a multi-register data buffer (701) having 16 8-bit registers, a read index counter (702), a write index counter (703), a write select decoder (704), a bank of 16 AND gates (705), a 16:1, 8 bit wide, data bus multiplexer (706), a grey code 32 translator (707), and a data comparator (708). Each of the buffer registers is a simple 8 bit register. The input controls to the RX FIFO consist of a read strobe, (FIFO_RD) (410) and a write strobe (FIFO_WR) (411). Each time a byte of data is written to the RX FIFO, the write index counter is advanced at the end of the write cycle. Each time a byte of data is read from the RX FIFO, the read index counter is advanced at the end of the read cycle. The counters are both grey encoded so that no more than one output bit will change each time either of the counters is advanced. The counters each contain 32 states in 16 pairs so that when both index counters point to the register it is possible to determine if the FIFO is empty (all data read) or if the FIFO is full (all 16 bytes have been written and none have been read).

The write select decoder (704) decodes the output of the write index counter (703) and asserts a single write select line associated with one of the FIFO registers (701). The select line is gated by the bank of AND gates (705) with the FIFO_WR signal (411) to create a single write strobe to the register index by the write index counter.

The grey 32 translator (707) converts the grey 32 code to a 4 bit binary code, which selects which of the FIFO registers outputs is placed on the output bus, RBR (297), by the FIFO data multiplexer (706). As will be described in the transmit pacing circuit (303), the host does not receive an indication that data is present in the RX FIFO until after the CPU has finished writing to the FIFO and then written a RX_PACE register (801). Consequently, only one of the read or write index counters will change at a time and the output of the data comparator (708) will be stable. Therefore, the RX FIFO does not require a synchronization circuit similar to that used by the TX FIFO (409).

Figure 5:
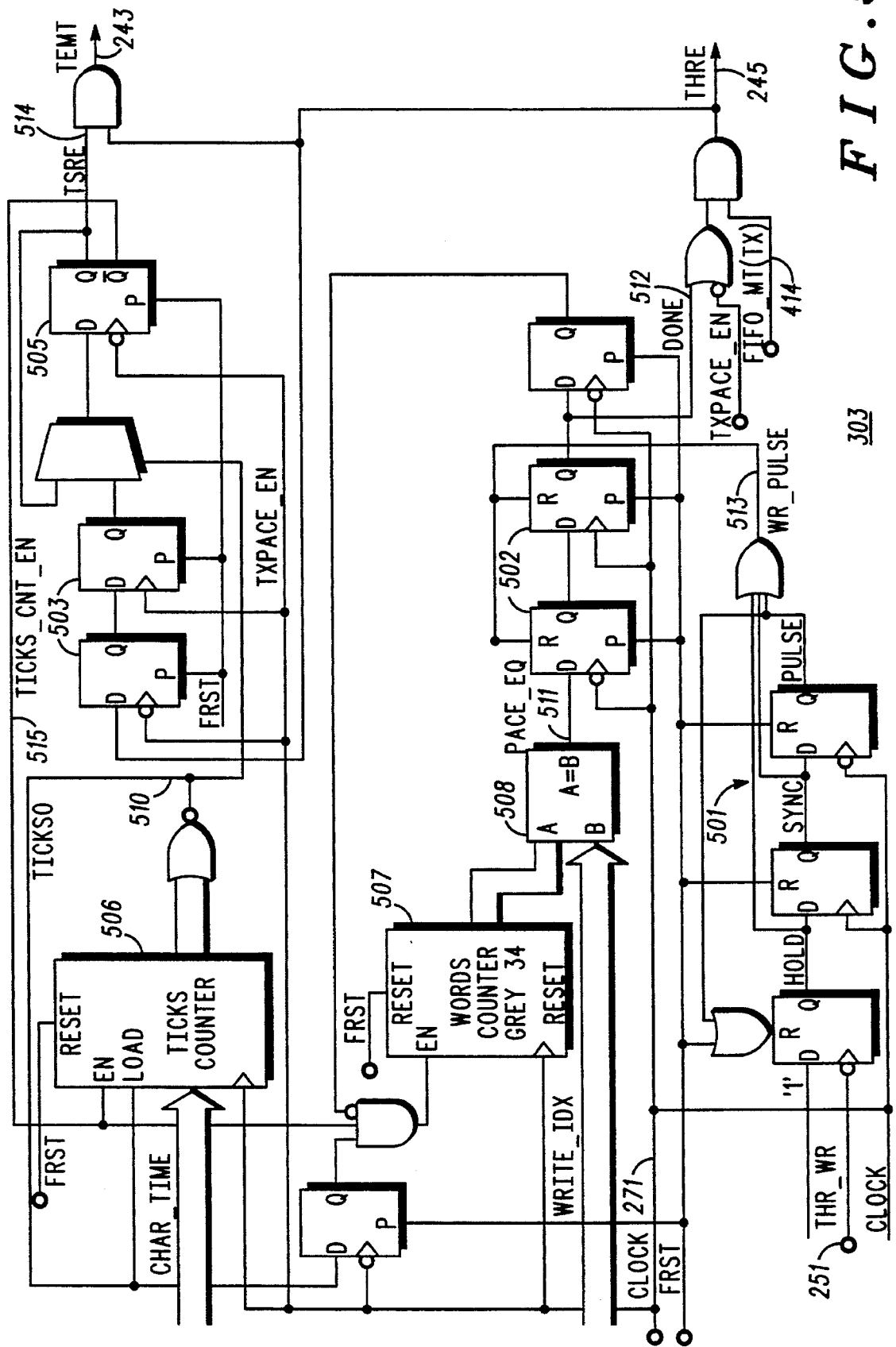
FIG. 5 is a more detailed block diagram of a transmitter pacing function as shown generally in FIG. 3.

Referring to FIG. 5, the transmit pacing circuit (303) is depicted and will be described in detail. The transmit pacing circuit is based on two binary counters, specifically, a TICKS counter (506) and a WORDS counter (507). The TICKS counter (506), counts down the number of clock ticks per character period as specified by the CPU in the Character Time (CHAR_TIME) Register (226). When the TICKS counter reaches zero, the TICKS0 signal (510) is raised, which causes the TICKS counter to be reloaded with the value of CHAR_TIME on the next rising clock edge. The TICKS0 signal also enables the WORDS counter (507), a grey 34 binary counter which advances once per character period, and tracks the TX FIFO write index value, WRITE_IDX (415). WRITE_IDX is compared with the output of the WORDS counter by a logic comparator (508). When the WORDS counter output equals WRITE_IDX, the pacing period has been completed and the PACE_EQ signal (511) is asserted. PACE_EQ is resampled by two flip-flops (502) to remove potential logic glitches and to synchronize with the CLOCK (271) to form the DONE signal (512). The DONE signal (512) in turn causes the Transmit Holding Register Empty flag (THRE) (245) to be set, as soon as the CPU has read the contents of the TX FIFO, as indicated by the FIFO_MT (414) signal. Note that THRE is one of the standard flags defined in the NS16550A datasheet.

The pacing operation is started when a character is written to the TX FIFO. The THR_WR signal (251) which is the write strobe to the TX FIFO, causes a longer pulse, WR_PULSE (513) to be generated by the SLPGX pulse stretching circuit (501). WR_PULSE asynchronously clears the DONE flag (512), which immediately causes THRE (245) to be cleared. THRE is resynchronized by two flip-flops (503) and then clocked into the TSRE flip-flop (505), which clears TSRE (514) and sets the TICKS_CNT_EN signal (515) thus enabling the TICKS counter (506). THRE and TSRE are logically ANDed together to create the TEMT (transmitter empty) flag (243) as specified in the NS16550A datasheet. Writing additional data to the TX FIFO before the pacing cycle for one or more previous data bytes has been completed, will cause the DONE flag to be cleared again. DONE will not be set again until the WORDS counter (507) has caught up to WRITE_IDX (415).

Figure 8:
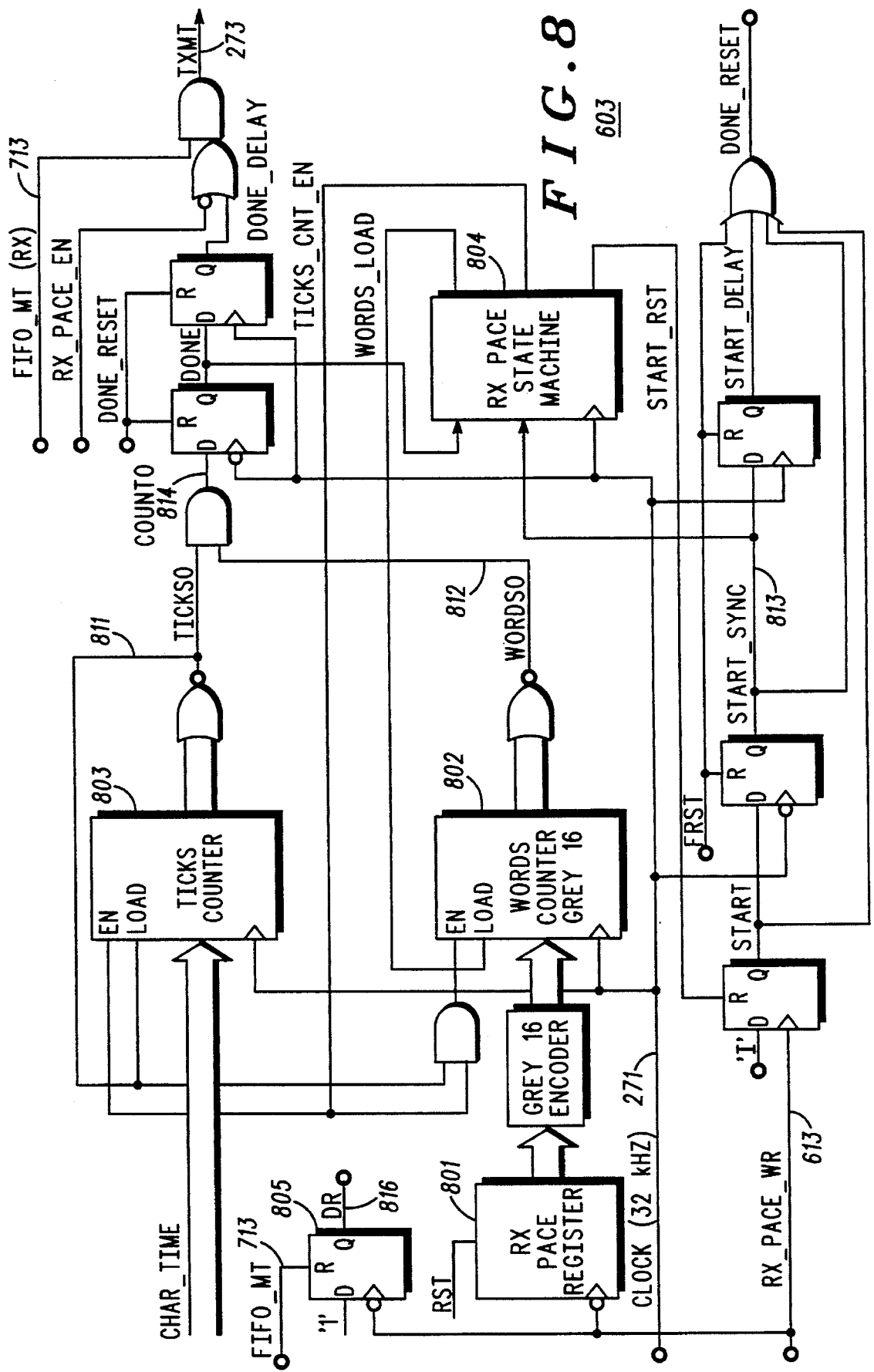
FIG. 8 is a more detailed block diagram of a portion of a receiver pacing function as shown generally in FIG. 6.
Figure 9:
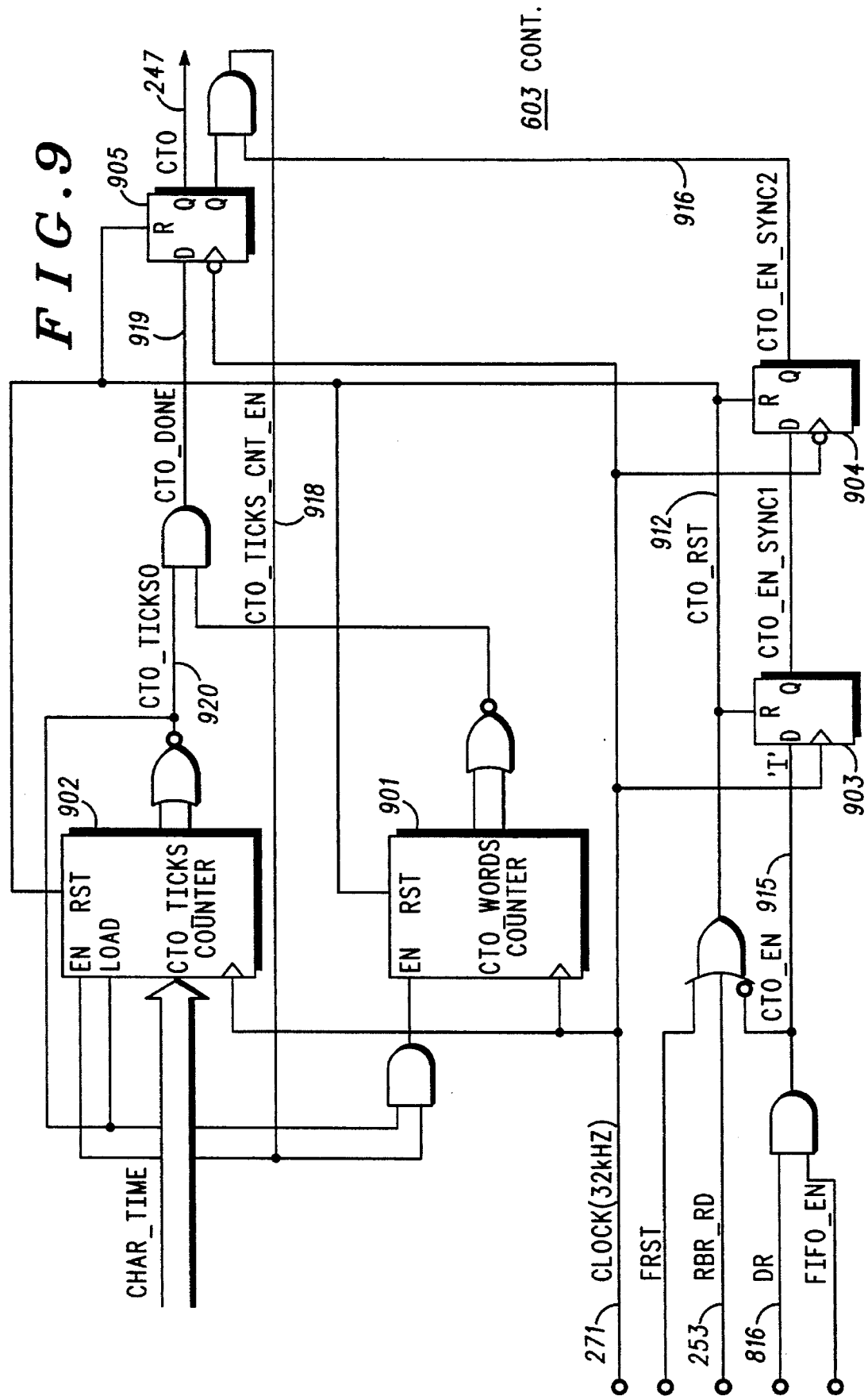
FIG. 9 is a more detailed block diagram of a further portion of the receiver pacing function as shown generally in FIG. 6.

Referring to FIG. 8 and FIG. 9, the receive pacing circuit (603) is depicted and will be described in further detail. The main receive pacing circuit, depicted in FIG. 8, includes the RX_PACE register (801), a words counter (802), a ticks counter (803), and a state machine (804). The receive pacing circuit is started when the CPU writes a value, indicating the number of bytes the CPU has written to the RX FIFO, to the RX_PACE register (801). The write strobe for this register, RX_PACE_WR (613), is resynchronized to form START_SYNC (813). The state machine (804) is activated by START_SYNC, and this causes the words counter (802) to be loaded with the value from the RX_PACE register (801) and the ticks counter to be loaded with the value from the CHAR_TIME register (226). The ticks counter is decremented once per clock cycle. When the ticks counter achieves a value of zero, TICKS0 (811) is asserted. On the next rising clock edge, the words counter is decremented and the ticks counter is reloaded with the value of CHAR_TIME. Since this cycle consumed CHAR_TIME clock ticks, the cycle will have a duration equivalent to the time to transmit one character at the specified baud or data rate. When both the words counter and the ticks counter have reached zero, a COUNT0 signal (814) is asserted. COUNT0 is resynchronized on the falling clock edge to set DONE (815), which causes the state machine to disable both of the counters. When both DONE is asserted and the host has read the contents of the RX FIFO causing FIFO_MT (RX) (713) to be asserted, the transmit empty flag, TXMT (273), is raised, signaling the CPU that it may write more data to the RX FIFO. The DR flip-flop (805) is set when RX_PACE is written, indicating to the PCMCIA host that data is ready to be read from the RX FIFO. The DR flip-flop is cleared when FIFO_MT (RX) (713) is asserted again.

The character time-out portion of the RX pacing circuit causes the host to be interrupted if there is one or more bytes in the RX FIFO and the RX_FIFO has not been read within a period of time equal to four serial character transmission times. Referring to FIG. 9, the character time-out (CTO) receive pacing circuit includes inter coupled as indicated a CTO_WORDS counter (901), a CTO_TICKS counter (902), two flip flops (903 and 904) to synchronize the CTO_EN signal (915) and a flip-flop (905) to synchronize the CTO_DONE signal (919). The CTO pacing circuit is started when DR flag (816) is raised causing the CTO_EN signal (915) to be asserted. Since DR occurs asynchronously to the CLOCK signal (271), CTO_EN is resynchronized by two flip flops (903 & 904) to create the CTO_EN_SYNC2 signal (916). CTO_EN_SYNC2 is gated with the inverted output of the CTO flip-flop (905) to form the CTO_TICKS_CNT_EN signal (918). Since the CTO signal (247) is not asserted when DR (816) is set, the setting of DR will cause CTO_TICKS_CNT_EN to be asserted, thus enabling the CTO_TICKS counter (902). The CTO TICKS counter starts with a value of "0"; therefore, CTO_TICKS0 (920) is asserted and the CTO_WORDS counter (901) will also be enabled. The first rising CLOCK edge causes the CTO_TICKS counter (902) to be loaded with the value from the CHAR_TIME register (226) and decrements the CTO_WORDS counter (901). The CTO_TICKS counter is decremented once per clock cycle. When the CTO_TICKS counter achieves a value of zero, the CTO_WORDS counter is enabled by CTO_TICKS0 (920). On the next rising clock edge, the CTO_WORDS counter is decremented and the CTO_TICKS counter is reloaded with the value of CHAR_TIME. When both the CTO_WORDS counter and the CTO_TICKS counter have reached zero, the CTO_DONE (919) signal is asserted. The CTO flip-flop (905) resynchronizes CTO_DONE on the opposite edge of the CLOCK, causing CTO (247) to be asserted, which in turn unasserts CTO_TICKS_CNT_EN (918), thus disabling the counters (901 & 902).

Should at anytime during this process, the host read the RX FIFO, as indicated by the RBR_RD strobe (253), the CTO_WORDS counter (901) is reset to a value of 4, the CTO_TICKS counter (902) is reset to zero and the flip-flops (903, 904 & 905) are all cleared. If the DR flag (816) is still raised, indicating there is at least one data byte still available in the RX FIFO, the CTO pacing circuit will be reactivated as described in the preceding paragraphs.

Looking at FIG. 8, when the RX FIFO has been emptied by the host, causing the FIFO_MT (713) flag to be asserted, the DR flip-flop (805) is cleared. In FIG. 9, the DR signal going low causes the CTO_RST signal (912) to be asserted, which resets the CTO pacing circuit and holds the circuit in a reset state until DR is again set.

A corresponding method embodiment of the instant invention that utilizes the above described interface device includes the steps of emulating a host computer port that includes an address map for a plurality of registers, the plurality of registers corresponding to the registers of a UART, providing a peripheral controller port that includes an address mapped parallel interface to the plurality of registers, and generating status signals at the host computer port and at the peripheral controller port, the status signals substantially corresponding to status signals from the UART. The method may have additional steps including a step of storing control, status, and data information in the plurality of registers and pacing the step of storing the data information in the plurality of registers so as to emulate various timing limitations, such as a baud rate of the data information, of the UART.

It will be appreciated by those of ordinary skill in the art that the apparatus and methods disclosed provide various approaches for interfacing by way of an emulated UART, a host computer or processor to a peripheral controller. These inventive approaches may be readily and advantageously employed to interface a packet data modem or other communications device or system to a host terminal where the host terminal is arranged and constructed to accept a PCMCIA compatible or compliant peripheral function and to communicate with such peripheral function using proven communications software that expects to see a UART or UART like interface, without otherwise sacrificing physical space, material cost, or functionality of the peripheral function. Hence, the present invention, in furtherance of satisfying a long-felt need of computer peripherals and more specifically PCMCIA compliant computer peripherals, provides an exemplary approach to interfacing such peripherals to a host terminal that relies on proven communications packages to accomplish such an interface without worrying about continued operating system maintenance or compatibility.

It will be apparent to those skilled in the art that the disclosed invention may be modified in numerous ways and may assume many embodiments other than the preferred form specifically set out and described above. For example, while one pacing circuit and its various properties have been discussed others clearly exist. Accordingly, it is intended by the appended claims to cover all modifications of the invention which fall within the true spirit and scope of the invention.

What is claimed is:

1. A peripheral card adapted for coupling to a host processor, comprising:
    an emulated universal asynchronous receiver transmitter (UART) comprising:
    a plurality of registers corresponding to the registers of a UART,
    a host processor port having a first address mapped parallel interface for said plurality of registers,
    a peripheral controller port having a second address mapped parallel interface for said plurality of registers, and
    control logic for providing status signals, including UART signals, to said host processor port and to said peripheral controller port;
    a peripheral card parallel interface coupled to said host processor port and adapted for coupling to a parallel interface of said host processor;
    a peripheral card controller coupled to the peripheral controller port.

2. The peripheral card of claim 1 wherein said plurality of registers comprise a control register, a status register, and a data register.

3. The peripheral card of claim 1 wherein said plurality of registers further comprise a multi-register data buffer.

4. The peripheral card of claim 3 wherein said multi-register data buffer further includes a pacing circuit controlling the emulated UART to have timing limitations corresponding to timing limitations of said UART.

5. The peripheral card of claim 4 wherein said pacing circuit is dependent on a baud rate of data.

6. The peripheral card of claim 5 wherein said peripheral card parallel interface is compatible with a PCMCIA standard.

7. The peripheral card of claim 1 wherein said plurality of registers further includes a multi-register data buffer for transmit data and for receive data.

8. The peripheral card of claim 7 wherein said multi-register data buffer further includes a pacing circuit for emulating the timing limitations of said UART, said pacing circuit operating for said transmit data and for said receive data.

9. The peripheral card of claim 8 wherein said pacing circuit is dependent on a baud rate of said transmit data.

10. The peripheral card of claim 9 wherein said pacing circuit is dependent on a baud rate of said receive data.

11. The peripheral card of claim 1 wherein the peripheral card is a PCMCIA card, said peripheral card parallel interface is compatible with a PCMCIA standard, and the peripheral card further comprising an rf (radio frequency) modem coupled to the peripheral card controller.

12. In a peripheral card including a peripheral controller and a peripheral card parallel interface adapted for coupling to a host processor, a method comprising:
    providing a plurality of registers corresponding to the registers of a UART (universal asynchronous receiver transmitter) including a peripheral controller parallel port coupling the peripheral controller and the plurality of registers, and a host processor parallel port coupling the peripheral card parallel interface and the plurality registers;
    parallel mapping signals between the peripheral controller parallel port and said plurality of registers in a manner emulating a UART, and further parallel mapping the signals between the plurality of registers and the host processor parallel port in a manner further emulating a UART.

13. The method of claim 12 further including a step of storing at least one of the group consisting of control, status, and data information in said plurality of registers.

14. The method of claim 13 further including a step of pacing said step of storing in said plurality of registers, said step of pacing comprising emulating the timing limitations of said UART.

15. The method of claim 14 wherein said step of pacing is further dependent on a baud rate of said information.

* * * * *